United States Patent [19]
Chiron et al.

[11] Patent Number: 4,880,541
[45] Date of Patent: Nov. 14, 1989

[54] HOT FILTER MEDIA

[75] Inventors: Paul J. Chiron, Victoria; Kevin D. Watson, South Australia; Raymond W. Shaw, Victoria, all of Australia

[73] Assignee: Comalco Aluminum Limited, Melbourne, Australia

[21] Appl. No.: 172,441

[22] Filed: Mar. 24, 1988

[30] Foreign Application Priority Data
Apr. 3, 1987 [AU] Australia ................ PI1243

[51] Int. Cl.$^4$ .................. B01D 39/14; B05D 5/00
[52] U.S. Cl. .................. 210/496; 210/506; 210/510.1; 210/773; 427/244; 427/190; 427/215
[58] Field of Search .......... 210/496, 506, 510.1, 210/773; 427/244, 190, 215

[56] References Cited
U.S. PATENT DOCUMENTS
4,278,544  7/1981  Takashima ............... 210/510.1 X
4,690,763  9/1987  Rieger et al. ............ 210/496

FOREIGN PATENT DOCUMENTS
0076781  4/1983  European Pat. Off. .

Primary Examiner—Michael Lusignan
Attorney, Agent, or Firm—Roylance, Abrams, Berdo & Goodman

[57] ABSTRACT

A filter medium suitable for hot liquid and gaseous materials, more particularly molten metals, for example aluminium and its alloys, is characterized by the use of sintered ultrafine bauxite granules. Filter media according to the invention exhibit superior thermal shock resistance, may be used repeatedly and are much cheaper than filter media of the prior art.

19 Claims, 3 Drawing Sheets

INITIAL ALUMINIUM METAL

METAL WITH $TiB_2$ TRACER INCLUSIONS

FILTERED ALUMINIUM METAL

HOT FILTER MEDIA

This invention relates to filters or filter media for hot liquid and gaseous materials and more particularly for molten metals, such as, for example, molten aluminium/aluminium alloys.

Molten metals, e.g. molten aluminium, always contain entrained solids which are deleterious to the final cast metal product. These entrained solids usually derive from three sources. Some are particles of aluminium oxide which are drawn into the liquid stream from the floating oxide layer on its surface, and some entrained particles are fragments of furnace linings, transfer troughs and other portions of the molten aluminium handling equipment which are eroded and entrained in the flowing aluminium stream, and some particles are precipitates of insoluble impurities such as intermetallics, borides, carbides or precipitates of other aluminium compounds, such as chlorides. The presence of such various insoluble impurities or inclusions in the final product is, of course, detrimental and efficient filtering produces improvements in ductility, strength, product uniformity, machinability, electrical conductivity, fluidity and mould life. Conversely linear defects in sheet and foil are reduced, as are rejections due to inclusion related inferior surface finish. Gas content of metal, bubble formation and pinholes are also reduced and less re-working of defective material is required.

Accordingly, it is desirable to remove entrained solids from the molten aluminium stream before it is cast into ingots for subsequent forming operations, such as rolling, forging, extrusion, etc., or into moulds for the production of castings.

Filtering to remove entrained solids from liquids is effected by passing the solid laden liquid through a porous filter medium that will not let the solids pass. Filtering molten metal in general, and molten aluminium in particular, creates special problems because the liquid is highly reactive so that it is difficult to find a filter medium capable of withstanding it.

The present invention provides a new filter medium having significant advantages over the filter media of the prior art, and is characterized by the use of sintered ultrafine bauxite granules.

Filter media now used for filtering molten metals are principally of two kinds—

(1) open weave glass cloth screens and loose bed filters (2) rigid ceramic foams or rigid media filters.

The most common filter medium in the first category is an open weave glass cloth screen placed in a metal transfer trough, around a spout or even in the molten metal pool in the top of the solidifying ingot. Such cloth screens are able to remove only the larger sizes of inclusions from the metal and are easily ruptured during use because the glass fibers become very weak at the temperature of molten aluminium.

In loose bed filters, molten aluminium is filtered through a bed of loose particles, for example, tabular alumina or carbon granules. Drawbacks normally associated with bed filters are a tendency to let too many solid particles pass through, also channeling effects which mitigate against efficient functioning. The pore size of such filters changes readily when in use so that, even if this is correct originally, it is difficult or impossible to maintain. In addition the filter must be kept surrounded by molten metal at all times, whether in use or not.

The second category is made up of ceramic foam filters which are produced from aqueous slurries based on $Al_2O_3$, with or without binding agents, such as, for example, bentonite, often also including $Cr_2O_3$. Silicon carbide is another material used for such filters. Typical examples are provided in U.S. Pat. Nos. 3,947,363; 4,343,704; 4,391,918; 2,863,558.

To produce ceramic foams, replicas of the desired filter shapes, which are moulded in foamed polyurethane or other plastics, are immersed in said slurries, allowed to set and then fired at sufficiently elevated temperatures to burn off the plastic resulting in rigid ceramic foam structures.

Typical of bonded media or particle filters is a filter originally developed by Kaiser Aluminium Inc., U.S.A., and licensed and further developed by Metaullics Systems Inc., also of the U.S.A.

It should be noted, however, that these filters employ expensive refractory grains of e.g., $Al_2O_3$, as distinct from the cheaper and more robust bauxite proposed in this invention.

Yet another important point of difference between these filters and the bonded media filter of this invention is in the method of preparation of the binder. As will be seen below, in one form of the invention, our binder is produced from a blended powder mixture of boric acid, calcium oxide and ultrafine bauxite. A coating of such powder is then applied to sintered ultrafine bauxite granules using water as a binder. The coated granules are dried and fused to form a rigid mass. This is preferable to preparing binders according to the existing state of knowledge which involves fusing of mixtures containing pure aluminium oxide, boric acid and calcium oxide to produce a glassy type of material which is ground prior to being mixed with more aluminium oxide or any other refractory(ies) selected.

A principal disadvantage of known filter media in the second category, compared with the present invention, is the high cost of the materials required compared with bauxite. Crushed alumina or silicon carbide of the required quality as to purity, particle size, and particle shape, is expensive to buy or produce. Another disadvantage is that these high cost filters are relatively delicate and can generally only be used once. Their thermal shock resistance is variable which leads to spalling with ensuing melt contamination.

Filters made from bauxite according to the invention may be used repeatedly and can be expected to be little affected until a service temperature of about 1200° C. (or about 1050° C., if a binder is used) is reached.

As a material for the construction of such filters bauxite has the advantage of being readily produced in a wider range of grain sizes and shapes than alumina and other materials known in the art.

As indicated above, the filter medium of the present invention is characterized by the use of sintered ultrafine bauxite granules. Ultrafine bauxite is bauxite composed of discrete mineral particles of an average size typically in the range of from 0.1 microns up to 1.0 mm, for example 0.2 microns.

In one embodiment of this invention the filter medium is made up of sintered ultrafine bauxite granules which are bonded together with a binder based on calcium borate and ultrafine bauxite, to form a rigid porous structure.

Such bonded filters may advantageously replace ceramic foam, loose bed and other bonded media filters currently used in aluminium foundries. Other applications are seen to exist in lower temperature ferrous and other foundries where the higher strength and filter efficiency of this variant of the invention may encourage wider use of filters.

As desired, once only or multiple use of the filters is envisaged. Closely related are filter frits which are used to filter very fine inclusions from molten metal (e.g. micron and sub-micron sizes). Applications for frits also exist in the filtration of hot gases, aqueous and organic fluids. Example 2 describes a typical cycle for the production of filter frits. Filter frits permit the use of somewhat higher operating temperatures.

In yet another embodiment ultrafine bauxite is slurried, preferably with water, to provide a material of suitable consistency for extrusion. After extrusion the so called "green filter" is dried at room temperature for about 20 hours, then heated at a slow rate (about 1° C./min.) to some 600° C., then more rapidly (about 10° C./min.) to the sintering temperature which can be as high as 1,600° C. Reducing conditions may be utilised to assist the components of the bauxite to form a liquid phase and bind the structure together at lower temperatures. As a continuous ribbon of material is being extruded, it can be arranged in layers to build a bed of material in a controlled manner (see FIG. 3 and Example 4 below). Filters may be used with or without a surface coating to improve their ability to capture and retain inclusions.

The areas of application for extruded and bonded media filters are similar. One important property of extruded filters is their high temperature stability which is brought about by the properties of the mineral binding phase. Complete control over the porosity and metal flow behaviour widens the area of application by enabling filters to be designed to specific requirements.

The above embodiments enable a wide range of filtration characteristics, as well as of physical shapes of filters to be produced.

Bauxite granules required for the present invention may be derived from—

1. Dried agglomerated ultrafine grains which have been crushed and sized to within the range 0.1 mm to 20 mm and sintered at 1200° C. to 1600° C.

2. Dried sedimented slurry which is sintered at 1200° C.–1600° C. in the size range in which it is reclaimed, followed by crushing and sizing to within the range 0.1 mm to 20 mm.

3. Ultrafine bauxite powder which is compacted under pressure with or without a compaction aid (such aid can typically be water, PVA, etc.), sintered at 1200° C.–1600° C., crushed and sized to within the range 0.1 mm to 20 mm.

4. Ultrafine bauxite powder which is pellitized to form agglomerates of controlled roundness and sphericity in the size range 0.1 mm to 20 mm then sintered at 1200° C.–1600° C.

To produce the binder required in accordance with one form of the first embodiment of the invention boric acid and calcium oxide powders are mixed in the ratio 2 parts CaO to 3 parts $H_3BO_3$. These are fused at 1250° C. to form a calcium borate. The fused material is reduced in size to less than 100 μm. This powder is mixed with ultrafine bauxite in the ratio of 1 to 1.

Selected granules are coated with binder using water to make the binder adherent. The binder coating may be from 5 to 30 weight percent of the granule mass.

The coated granules are dried at 100° C. then fused together at 1000° C. to 1200° C. to form a rigid mass. In the accompanying drawings.

EXAMPLE 1

One (1) kilogram of ultrafine bauxite obtained from a by-product of standard bauxite beneficiation carried out at Comalco's bauxite mine, at Weipa, Queensland, was crushed and sized to a particle size of —3.35 to +2.00 mm followed by sintering at 1500° C. for one hour.

The sintered material was screened to —2.36/+2.00 mm and 200 g of these granules were coated with 40 g of binder.

The binder consisted of 20 g of ultrafine bauxite and 20 g of calcium borate powder. The calcium borate powder contained 8 g CaO (technical grade) and 12 g $H_3BO_3$ (technical grade) which was heated at 1250° C. for one hour in a carbon crucible. The surfaces of the granules were wetted with water and the wetted granules rolled in the binder powder, which had been reduced in size to less than 100 micron.

The coated granules were dried and heated at 1050° C. for 15 minutes in a 50 $mm_3$ graphite mould. This produced a fused, permeable filter suitable for use.

To test the efficiency of the filter made some 5.0 kg of aluminium "doped" with 0.750 g titanium diboride with a particle size of 10 μm or less to provide tracer inclusions, was poured through the filter at a temperature of 700° C.

Spark emission spectroscopy was used to determined the titanium levels in three conditions, as below:

| Sample  | Ti %  |
|---------|-------|
| Initial | 0.018 |
| "Doped" | 0.033 |
| Filtered | 0.018 |

Figure 1:
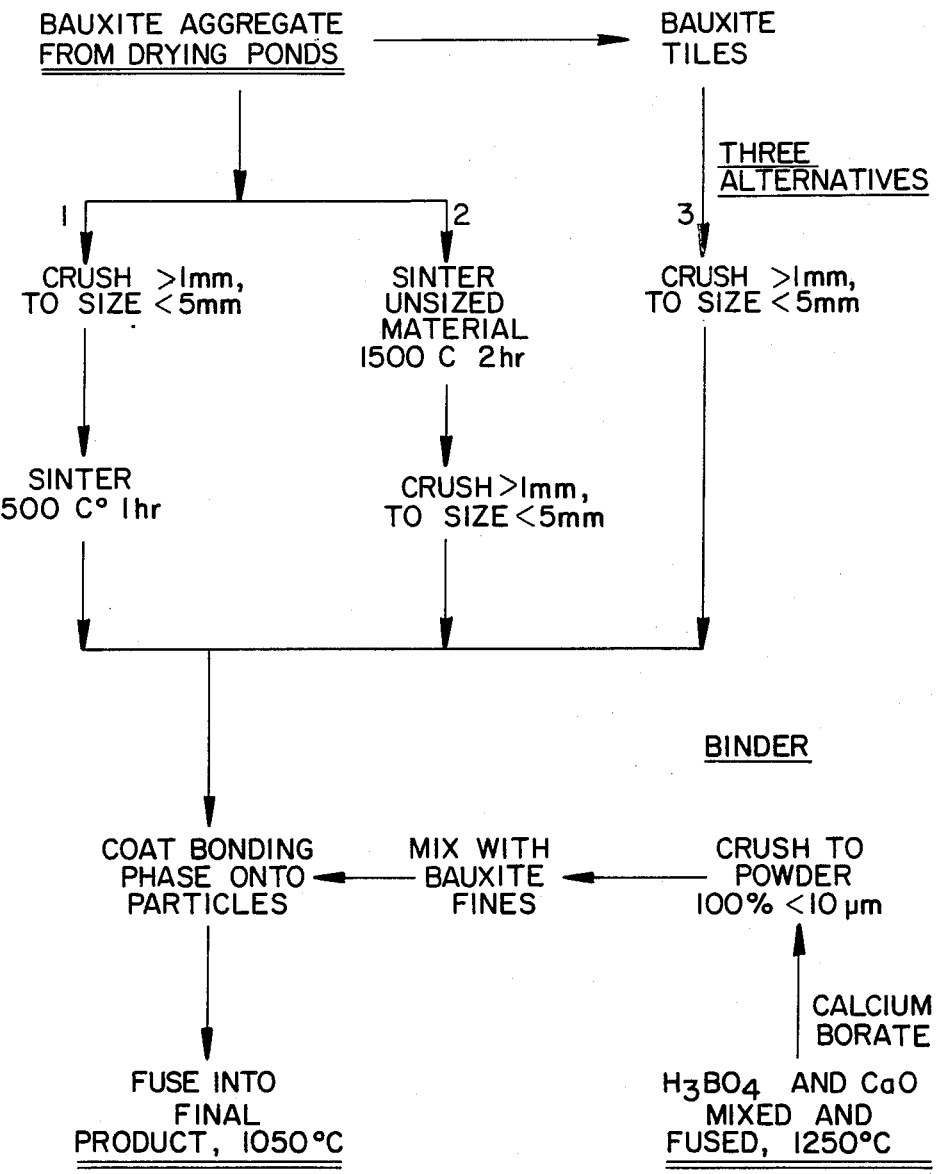
FIG. 1 is a flow sheet illustrating one form of the first embodiment of the invention.
Figure 2A:
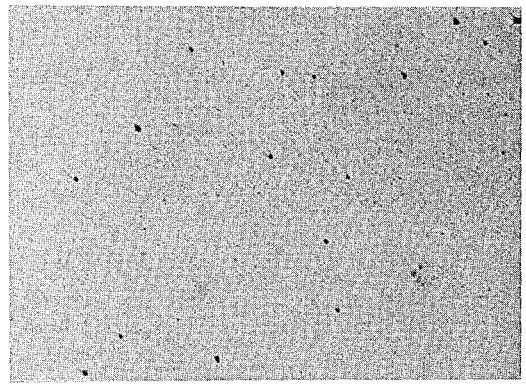
FIGS. 2a, 2b and 2c depict micrographs illustrating the efficiency of a filter according to the invention.
Figure 2B:
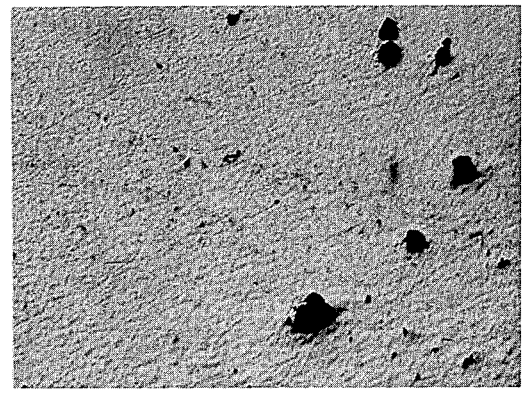
Figure 2C:
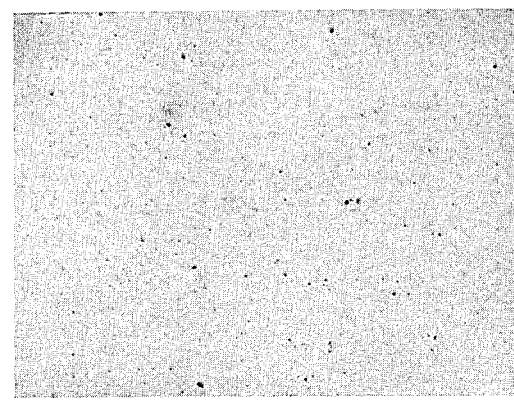

In addition corresponding micro-sections were prepared and examined at a magnification of ×50. It is clear from the photomicrographs in FIG. 2 that the filtered metal is free from inclusions.

EXAMPLE 2

Three (3) kilograms of spray dried ultrafine bauxite, having a mean particle size of 100 micron, were pelletised using an Eirich high shear mixer. Water was used as the binding agent and a constant agitator speed of 3,000 to 5,000 RPM to provide pellets of maximum density.

The green pellets were dried at 100° C. for 12 hours and then sintered at 1,400° C. in a static muffle furnace having a neutral atmosphere. A heating rate of 20° C. per minute and a soak time of one hour at the sintering temperature were used. A 60 to 200 micron fraction was separated from the sintered pellet product for testing.

Seventy (70) grams of sintered pellets were placed in a graphite mould with a cylindrical cavity 100 mm deep and 15 mm in diameter. The pellets were packed to maximum density by placing the mould on a vibrating table. The mould and contents were heated to 1,500° C.

under reducing conditions to produce a fused permeable microporous product.

Discs of 2 mm thickness were cut from the fused product above (using a diamond cutting wheel) and force fitted into a graphite cylinder so that no gaps were present between the wall and the disc. The cylinder was then attached to a vacuum source and 2 kilogram of molten aluminium drawn through the disc.

All particles greater than 1 micron were removed producing a "very clean" metal. This was verified by examination of a polished cross-section of the disc. No evidence of inclusions within the body of the disc was found, all the inclusions having been trapped in the surface of the disc.

EXAMPLE 3

Two hundred (200) kilograms of ultrafine bauxite were dried at 100° C. then crushed to a particle size of −4.5 to +4.0 mm followed by sintered at 1,000° C. to 1,450° C. in a pilot scale rotary kiln. The sintered material was screened at −8.35/+2.36 and +2.36/−2.00 mm. Each size fraction was divided into 9 kilogram lots and then coated with 1.6 kilogram of binder.

Calcium oxide, boric acid and ultrafine bauxite powder were fused to produce a glass binder at 1,250° C. which was subsequently crushed to less than 100 micron. The proportions of components in the glass binder were 8 parts CaO, 12 parts $H_3BO_3$ and 20 parts ultrafine bauxite, by weight.

The surfaces of the ultrafine bauxite granules were wetted with water, then rolled in the binder powder and the process repeated until all the powder had completely coated the granules.

The coated granules were placed in a graphite mould of dimensions 305×305×50 mm and heated to 1,050° C. Maximum temperature was maintained for 15 minutes and a heating rate of 10° C. per minute employed. This produced a fused, permeable filter ready for use.

To test the performance of the filters produced in the above way, 3 tonnes of aluminium alloy (Type 6063) was passed through each filter. An actual plant casting station was used as the site for the test and normal production operating conditions were followed. Filter efficiency was found to be greater than 70%, as measured by a combined particle concentration and scanning electron microscope analysis technique.

EXAMPLE 4

Figure 3:
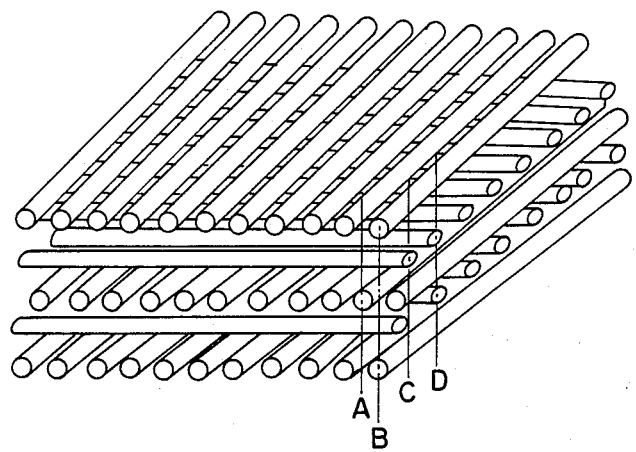
FIG. 3 illustrates the construction of a filter according to Example 3 below. The invention will be further illustrated by the following non-limiting examples.

One (1) kilogram of ultrafine bauxite was dried at 100° C. for 1 hours, crushed and sized to a particle size of less than 100 μm. A total of 250 gm of water (the binding agent in this case) was gradually added to the ultrafines while being mechanically mixed at a speed of 1000 rpm. The resultant "plastic" mixture was then extruded through a die incorporating a 4 mm nozzle aperture. 100 mm lengths of extruded "rod like" material were placed in layers building up a three dimensional grid of the dimensions 100 mm×100 mm×80 mm as illustrated in FIG. 3. Care was taken to ensure that alternate layers of extruded material were offset so that the voids produced in the previous layer were obstructed by the next layer of material.

The "green filter" was then dried at 100° C. for 20 hours, followed by heating to 600° C. at 1° C. per minute, then final heating to 1400° C. at a rate of 10° C. per minute where the temperature was held for 30 minutes. A reducing atmosphere was maintained during the heating process.

Preliminary tests have indicated that the priming performance, i.e. the building up of a head of liquid so that the forces restricting the flow through the filter are overcome, to be equal to that of conventional bonded media and foam type filters.

It will be clearly understood that the invention in its general aspects is not limited to the specific details referred to hereinabove.

It is also possible to sinter a naturally occurring bauxite fraction of suitable size and shape without slurrying. In such case the individual particles fuse to form a porous monolith suitable for the purpose of the present invention.

We claim:

1. A filter medium suitable for removing entrained solids from fluids at high temperatures characterized in that said medium comprises sintered ultrafine bauxite particles having an average size between 0.1 microns and 1.0 millimeter.

2. A method of producing a filter medium suitable for removing entrained solids from molten metals having sintered ultrafine bauxite particles with an average size between 0.1 microns and 1.0 millimeter, comprising the steps of:
   (a) forming a blended powder mixture of boric acid, calcium oxide and ultrafine bauxite;
   (b) applying a coating of the product of step (a) to sintered ultrafine bauxite granules, using water as a binder;
   (c) drying the coated granules produced in step (b); and
   (d) fusing the dried product of step (c) to form a rigid porous mass.

3. A method according to claim 2 in which the blended powder mixture of boric acid, calcium oxide and ultrafine bauxite is produced by mixing boric acid and calcium oxide powders in the ratio of about 2 parts calcium oxide to 3 parts boric acid and fusing the mixture to form a calcium borate, reducing the fused material in size to less than 100 microns, and mixing the powder so produced with ultrafine bauxite in the ratio of about 1 to 1.

4. A method according to claim 2 in which the amount of coating applied in step (b) is from 5 to 30 weight percent of the granule mass.

5. A method according to claim 2 in which step (c) is carried out at about 100° C. and step (d) is carried out at 1000° C. to 1200° C.

6. A method of producing a filter medium suitable for removing entrained solids from fluids at high temperatures and having sintered ultrafine bauxite particles with an average size between 0.1 microns and 1.0 millimeter, comprising the steps of:
   (a) slurrying ultrafine bauxite, preferably with water, to produce a material of suitable consistency for extrusion;
   (b) extruding the material produced in step (a) to produce a green filter material;
   (c) drying the green filter material produced in step (b); and
   (d) sintering the dried product of step (c) to produce the desired filter medium.

7. A method according to claim 6 in which the extrudate produced in step (b) is laid in successive layers in a cross-hatched manner to produce a bed of green filter material which is then subjected to steps (c) and (d).

8. A method according to claim 6 in which step (c) is carried out at ambient temperature and step (d) is carried out by heating the dried product of step (c) at a slow rate to about 600° C. followed by heating at a more rapid rate to a sintering temperature.

9. A method according to claim 8 in which the sintering temperature is up to about 1600° C.

10. A method according to claim 6 in which step (d) is carried out under reducing conditions.

11. A method of producing a filter medium in the form of a microporous filter frit suitable for removing very small inclusions from molten metals, hot gases and aqueous and organic fluids and having sintered ultrafine bauxite particles with an average size between 0.1 microns and 1.0 millimeter, comprising the steps of:
 (a) pelletising ultrafine bauxite by mixing with water in a high shear mixer to produce green pellets;
 (b) drying the green pellets;
 (c) sintering the dried pellets; and
 (d) fusing the sintered pellets to form a fused permeable microporous filter frit.

12. A method according to claim 11 in which step (b) is carried out at about 100° C., step (c) is carried out at about 1400° C. and step (d) is carried out at about 1500° C.

13. A method according to claim 12 in which step (c) is carried out in an inert atmosphere and step (d) is carried out under reducing conditions.

14. A method of removing entrained solids from molten metals characterized in that the molten metal containing said entrained solids is filtered at high temperatures through a filter medium comprising sintered ultrafine bauxite particles having an average size between 0.1 microns and 1.0 millimeter.

15. A method according to claim 2 wherein the average size is 0.2 microns.

16. A filter medium according to claim 1 wherein said average size is 0.2 microns.

17. A method according to claim 6 wherein the average size is 0.2 microns.

18. A method according to claim 11 wherein the average size is 0.2 microns.

19. A method according to claim 14 wherein the average size is 0.2 microns.

* * * * *